No. 797,455. PATENTED AUG. 15, 1905.
C. A. PARSONS & G. G. STONEY.
GLASS REFLECTING MIRROR.
APPLICATION FILED MAY 26, 1903.

3 SHEETS—SHEET 1.

Attest:
J. Marlton
Edward Sarton

Inventors
Charles A. Parsons
George G. Stoney, by Ellis Spear Company
Attys

No. 797,455. PATENTED AUG. 15, 1905.
C. A. PARSONS & G. G. STONEY.
GLASS REFLECTING MIRROR.
APPLICATION FILED MAY 26, 1903.
3 SHEETS—SHEET 2.
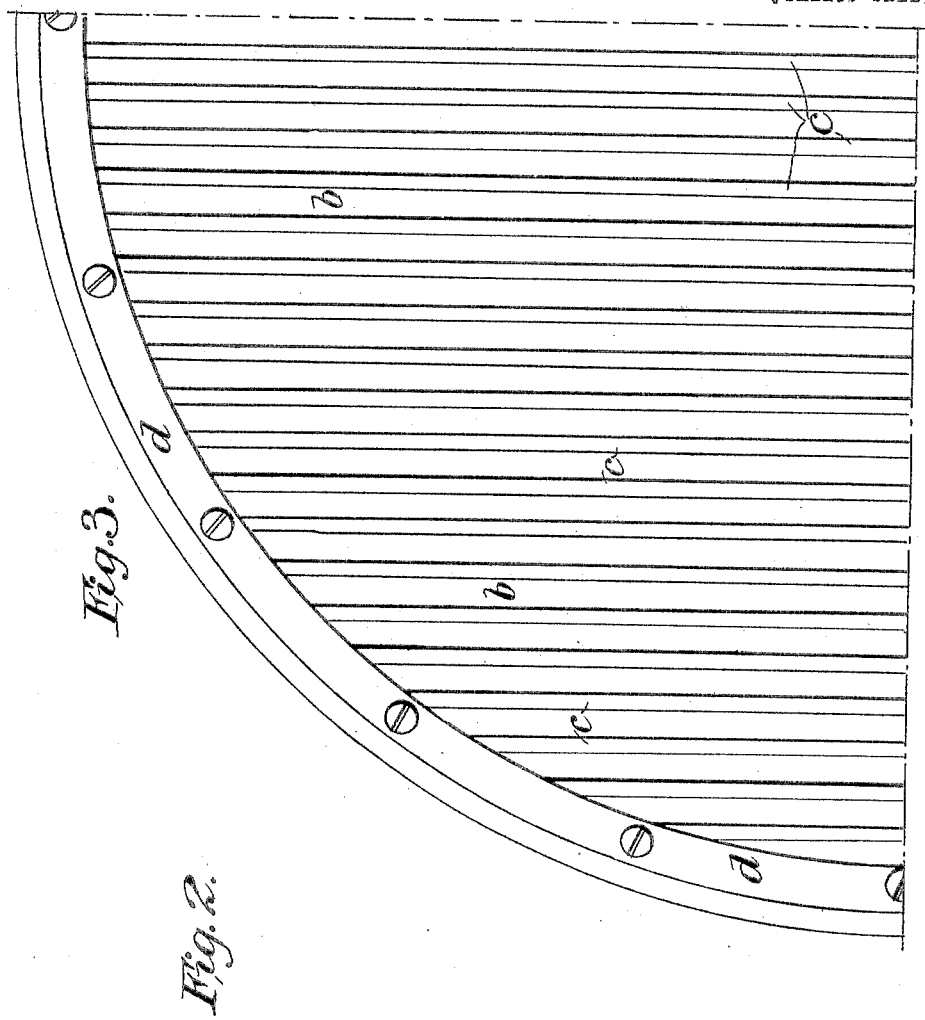
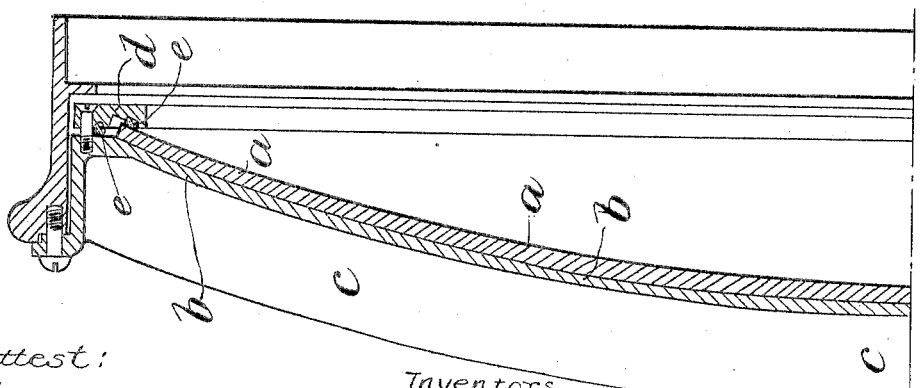
attest:
CJMiddleton
Edward Sartow
Inventors.
Charles A. Parsons
George G. Stoney.
by Ellis Spear Company
Atty's.

UNITED STATES PATENT OFFICE.

CHARLES ALGERNON PARSONS AND GEORGE GERALD STONEY, OF NEWCASTLE-UPON-TYNE, ENGLAND; SAID STONEY ASSIGNOR TO SAID PARSONS.

GLASS REFLECTING-MIRROR.

No. 797,455.  Specification of Letters Patent.  Patented Aug. 15, 1905.

Application filed May 26, 1903. Serial No. 158,904.

*To all whom it may concern:*

Be it known that we, CHARLES ALGERNON PARSONS and GEORGE GERALD STONEY, subjects of the King of Great Britain and Ireland, and residents of Heaton Works, Newcastle-upon-Tyne, in the county of Northumberland, England, have invented certain new and useful Improvements in Glass Reflecting-Mirrors, (for which we have made application for Letters Patent in Great Britain, No. 22,933, dated October 21, 1902,) of which the following is a specification.

Our invention relates to glass reflecting-mirrors, such as are used for search-light projectors, and has for its object to mount such mirrors in a more secure and protected manner than hitherto and also to cool the mirrors in such a way as to keep down the temperature even when they are placed near the most powerful electric arc.

We have discovered that by placing a conducting-surface in close proximity to the back of the mirror the transference of heat from the mirror to the backing is very rapid, and if the conducting-surface is kept cool by any efficient means the mirror will also be kept cool; also, if a thin layer of paper, asbestos, or other similar material be placed between the back of the mirror and the conducting-surface the cooling of the mirror is not seriously decreased.

Our invention therefore consists in mounting a mirror for such purposes as search-light projectors in close proximity to a backing made of a good conductor with or without a thin sheet of paper or other material placed between the backing and the mirror, the backing being cooled in any suitable manner.

Figure 1:
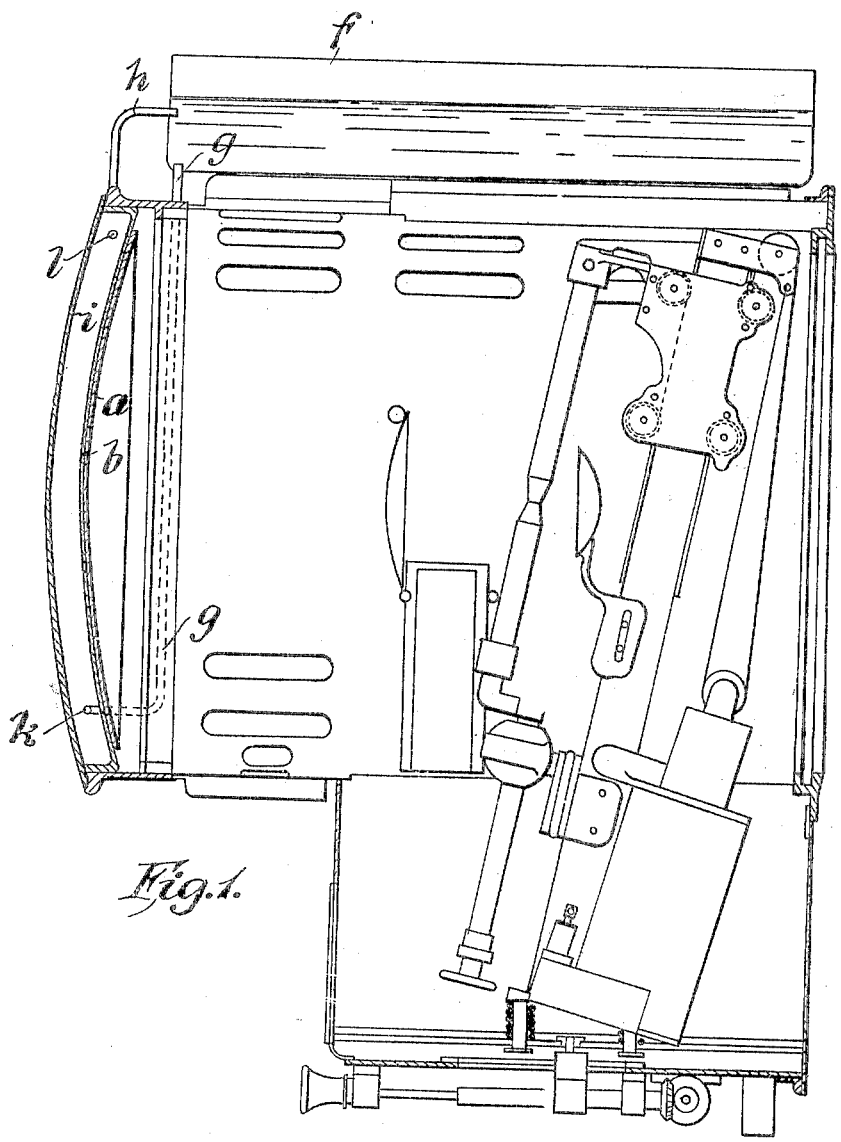
Figure 4:
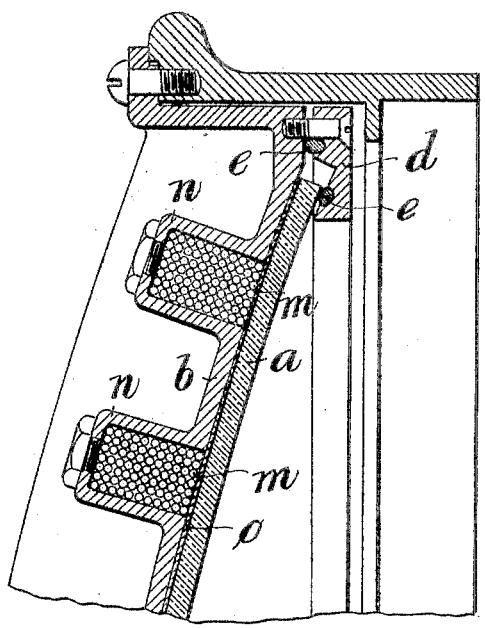

Referring to the accompanying drawings, which illustrate our invention, Figure 1 shows the invention applied to a search-light in which the mirror is cooled by water. Fig. 2 shows a vertical section, drawn to an enlarged scale, of the mirror and backing which is cooled by air. Fig. 3 shows an elevation of a portion of the backing of the mirror shown in Fig. 2. Fig. 4 is a section through a mirror in which the cooling is effected by shot or other granular material contained in the pockets at the back of the mirror.

In carrying our invention into effect according to one modification we construct the glass reflector $a$ in any well-known manner and provide a backing $b$, formed of a casting of aluminium or other material machined to the form of a hollow cup, curved so as to fit closely to the back of the mirror $a$, either in direct contact with it or with a thin layer of paper, asbestos, or other material (see Fig. 4) between them, so as to prevent the paint which protects the silver on the mirror $a$ sticking to the metallic backing $b$.

The backing may be cooled by any well-known method, such as gills or ribs $c$, attached to or forming part of the backing $b$ to increase the radiating-surface or the circulation of air, water, or other liquid, or by the use of acetate of soda or other crystals having considerable latent heat of fusion.

The mirror $a$ may be secured and held close to the backing by spring or clips or by a ring $d$, Fig. 2, which may have a packing of woodite, asbestos, or other material $e$ to prevent the access of moisture between the mirror and the backing or by any other suitable well-known means.

The backing shown in Fig. 1 is cooled by a water-jacket $i$, connected with the water-supply in the tank $f$ by the circulating-pipes $g\ h$.

Small pockets $n$ may be formed in the backing and filled with conducting material $m$, as shown in Fig. 4. The conducting material may be shot, aluminium granules, or the like, or masses of conducting material, such as very firm hard metal, may be placed between the backing and the mirror. A thin uniform sheet $o$, of any suitable elastic substance, is inserted between the mirror and the backing or any of the means described above. This thin sheet protects the paint at the back of the mirror, and it consists of a material such that it will readily give up its heat to the conductors provided for the cooling of the mirror.

Having now described our invention, what we claim as new, and desire to secure by Letters Patent, is—

1. In combination with a glass reflecting-mirror, a metallic plate fitted in close proximity to the back of the mirror and means in rear of said plate for keeping said plate and mirror cool.

2. In combination with a reflecting-mirror, a metallic plate fitted in close proximity to the back of the mirror, a thin sheet of protecting material placed between the metal backing and the mirror and means for keeping the backing-plate and mirror cool.

3. In combination with a reflecting-mirror, a metallic plate fitted in close proximity to the back thereof, an inclosed space behind said plate and a cooling medium in said space for keeping the backing-plate and mirror cool.

In witness whereof we have hereunto set our hands in presence of two witnesses.

CHARLES ALGERNON PARSONS.
GEORGE GERALD STONEY.

Witnesses:
 HENRY GRAHAM DAKYNS, Jur.,
 WILLIAM MENZIES JOHNSTON.